United States Patent
Bagley (10) Patent No.: US 9,350,548 B2
(45) Date of Patent: May 24, 2016

(54) TWO FACTOR AUTHENTICATION USING A PROTECTED PIN-LIKE PASSCODE

(71) Applicant: TOKENYM LLC, Cheyenne, WY (US)

(72) Inventor: Brian Bagley, St. George, UT (US)

(73) Assignee: Tokenym, LLC, Cheyenne, WY (US)

( * ) Notice: Subject to any disclaimer, the term of this patent is extended or adjusted under 35 U.S.C. 154(b) by 0 days.

(21) Appl. No.: 14/120,439

(22) Filed: May 30, 2014

(65) Prior Publication Data

US 2015/0349960 A1    Dec. 3, 2015

(51) Int. Cl.
*H04L 9/32*        (2006.01)
*H04L 29/06*       (2006.01)

(52) U.S. Cl.
CPC .......... *H04L 9/3242* (2013.01); *H04L 63/0428* (2013.01); *H04L 2209/24* (2013.01)

(58) Field of Classification Search
None
See application file for complete search history.

(56) References Cited

U.S. PATENT DOCUMENTS

| | | | | |
|---|---|---|---|---|
| 6,735,310 B1* | 5/2004 | Hsing | ..................... | G06F 21/31 380/28 |
| 6,981,145 B1* | 12/2005 | Calvez | ................ | H04L 63/0869 709/225 |
| 2007/0234062 A1* | 10/2007 | Friedline | ................. | G06F 21/31 713/183 |
| 2013/0055380 A1* | 2/2013 | Swann | ................ | G06F 21/6245 726/18 |
| 2013/0219472 A1* | 8/2013 | Hsu | ......................... | H04L 63/08 726/4 |
| 2014/0137224 A1* | 5/2014 | Todorov | .................. | G06F 21/36 726/7 |
| 2014/0282978 A1* | 9/2014 | Lerner | .................. | H04L 63/083 726/7 |
| 2015/0067327 A1* | 3/2015 | Lipton | .................. | H04L 63/083 713/168 |

* cited by examiner

*Primary Examiner* — Michael R Vaughan
(74) *Attorney, Agent, or Firm* — Workman Nydegger (57) ABSTRACT

For example, an implementation of the present invention can comprise a method for authenticating a user. The method can comprise an authentication server receiving from a user a password. The server can then hash the password such that a password hash is created. The server can then receive a second token from the user. Using the second token, the server can identify a sequence of characters associated with the second token within the password hash. The server can create an authentication token by removing the sequence of characters from the password hash. If the authentication token matches a stored value, the server can authenticate the user.

19 Claims, 5 Drawing Sheets

User enters 6, 8, 7, e.

TWO FACTOR AUTHENTICATION USING A PROTECTED PIN-LIKE PASSCODE

CROSS-REFERENCE TO RELATED APPLICATIONS

N/A.

BACKGROUND OF THE INVENTION

1. Technical Field

The present invention relates generally to computer-based encryption systems.

2. Background and Relevant Art

In general, authentication involves confirming or verifying a user's identity, as opposed to authorization, which typically involves determining and enforcing a user's access permissions. Usernames and/or passwords are perhaps the most familiar authentication scheme to many. Current username/password authentication, however, suffers from a number of significant drawbacks.

For example, username/password authentication is subject to eavesdropping and brute force attacks. Eavesdropping attacks typically involve rogue entities, such as rogue network devices or rogue operators of legitimate network devices, that read and analyze passing network traffic or to log keystrokes on a user's computer. When network traffic appears to contain username/password information (or for that matter any type of sensitive or personal information), the acquired information is logged for further analysis and/or future use.

Brute force attacks generally involve guessing passwords and/or usernames. Frequently, usernames for specific users are either known or can be inferred. For example, unlike passwords, which tend to be somewhat more arbitrary, usernames frequently have a strong resemblance to a user's actual name, public information about the user, or common words. Usernames generally are not considered by most to be confidential. As a result, brute force attacks are generally directed to passwords for known usernames.

Strictly speaking, a brute force attack implies trying all possible permutations in guessing a username/password. For example, a brute force attack on a four-digit PIN involves trying all 10,000 permutations of four digits (i.e., 0000-9999). Because remembering arbitrary information can be difficult, users often choose passwords that have some meaning. So-called dictionary attacks involve trying a limited set of permutations, such as commonly used words or numbers.

To help protect again brute force attacks, organizations often impose standards on allowable passwords, in terms of length, types of characters, expiration, similarity to previously used passwords, etc. For example, compare the four-digit PIN described above (10,000 permutations) with a four-digit password selected from numbers, uppercase letters, lowercase letters, and symbols (millions of permutations).

A wide variety of information may be available to a successful attacker. Depending on the access permissions associated with a particular username, an attacker may be able to gain access to sensitive personal information, business information, and/or personal information of other users. Such information may be used in connection with identify theft, fraudulent purchases, corporate espionage, and the like.

In order to protect usernames/passwords (and other information) from attack, encryption or other cryptographic techniques frequently are used. Encryption may be categorized as either symmetric or asymmetric. In symmetric encryption, the same key is used for both encryption and decryption. In asymmetric encryption, different keys are used for encryption and decryption. Public key infrastructures (PKIs), using a public/private key pair and a digital certificate, are examples of asymmetric encryption. Information encrypted with the public key can only be decrypted with the corresponding private key, and vice-versa. Typically, the public/private key pair and digital certificate are used for authentication and for exchanging a symmetric key to encrypt future exchanges, since continued use of the public/private key pair imposes a significant processing overhead, as compared to symmetric encryption.

Digital certificates and private/public keys are relatively bulky, and as indicated above, impose a certain amount of processing overhead. Furthermore, it is often difficult to transfer digital certificates and private/public keys from one device to another, making them a somewhat less attractive option for mobile computing devices. Authenticating for remote access from a public or third-party computer may not be practical, either because the remote access was not anticipated beforehand, and therefore the digital certificate and corresponding public/private key pair are not available, or because the potential for compromising the public/private key pair is simply too high.

Generally, for a given encryption algorithm, encryption strength depends on the length of the encryption key. Smaller keys are relatively easier to break than larger keys. Theoretically, however, given enough computing resources and time, it is possible to break virtually any encryption key. As an added precaution, therefore, encryption keys may be rotated periodically, so that even if one key is broken, information encrypted with other keys is not compromised.

For maximum protection, key rotation may occur after each key use. Key rotation after each use may be referred to as one-time pad encryption or simply one-time keys or passwords. With one-time passwords, subsequent passwords have no relationship to prior passwords. As a result, breaking one password does not provide any insight into what subsequent passwords might be. Conventionally, one-time pads require both ends of a communication to use the same technology, so that key usage at both ends may be synchronized. Although offering a high degree of protection, one-time passwords traditionally have imposed too much of a burden for general usage by the public at large. Furthermore, for wide-spread use, all potential parties would need access to the one-time password technology, which means that a trust relationship would already need to exist between all potential parties or that one-time passwords could not be used, like digital certificates and public/private key pairs, for authenticating arbitrary parties.

With the tremendous growth of on-line services, many users maintain accounts at multiple service providers. For users, maintaining multiple accounts often leads to selection passwords that are more easily remembered, and therefore more easily attacked. Aside from security consequences, on-line service providers have begun to recognize that it is inconvenient for users to authenticate to each service provider separately. Consider, for example, a user signing-on to a user account for his or her personal computer, then signing-on to a user account for his or her Internet service provider, then signing-on to a user account for email access, then signing-on to a user account at an on-line retailer to make a purchase. In addition to the complexity imposed by keeping track of each username and password, the user experience of constantly signing-on can be a source of frustration for the user.

In order to simplify authentication, some on-line service providers participate in single sign-on arrangements. Briefly, single sign-on allows a user to authenticate with one service in order to access services at one or more affiliated providers. Single sign-on effectively centralizes authentication within an authentication service. While perhaps improving the user experience, single sign-on also introduces a new risk. Because the authentication service maintains credentials (usernames, passwords, etc.) for a large number of users and potentially contains other personal, private, or secret information, the service is an attractive target for attackers, particularly in terms of exploiting any security vulnerabilities the authentication service has overlook or failed to appreciate. Accordingly, a relatively increased level of hostile resources may be focused on the authentication service, since if successful, an attack is likely to yield information about a comparatively large number of users.

As a result, methods, systems, and computer program products are desired that provide the benefits of double authentication, while at the same time protecting a second authentication token from potential data breach. Furthermore, it is desired to provide systems that protect users from key loggers that can identify user passwords.

BRIEF SUMMARY OF THE INVENTION

Implementations of the present invention comprise systems, methods, and apparatus configured to provide two-factor authentication with a protected PIN-styled passcode. In particular, implementations of the present invention comprise authentication schemes where a user or client device is provided with a PIN-type code that is derived from the hash of the user's password. For example, in at least one implementation, the PIN-like passcode comprises a sequence of numbers randomly removed from the hash result of the user's or client password. Accordingly, one or more implementations of the present invention provide a system where an authentication server can authenticate both a user/client password and a user/client PIN-like passcode without storing any information relating to the PIN-like passcode itself, and where the stored value of the password hash has been randomly altered by the removed PIN-like passcode, henceforth possessed only by the user or client device, making it more difficult to determine the original password from a brute-force attack.

For example, an implementation of the present invention can comprise a method for authenticating a user or client device. The method can comprise an authentication server receiving from a user a password. The server can then hash the password such that a password hash is created. The server can then receive a second token from the user or client device. Using the second token, the server can identify a sequence of characters associated with the second token within the password hash. The server can create an authentication token by removing the sequence of characters from the password hash. If the authentication token matches a stored value, the server can authenticate the user or client device.

Additionally, implementations of the present invention can comprise another method for authenticating a user or client device. The method can comprise a user or client receiving a prompt to submit a password. In response, the user or client can submit a password. The user or client can then receive a prompt to submit a second password. In response to the second prompt, the user or client can submit a second password. The second password may comprise a previously selected sequence of characters derived from a hash of the user password.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and apparatus configured to provide two-factor authentication with a protected PIN-styled passcode. In particular, implementations of the present invention comprise authentication schemes where a user or client device is provided with a PIN-type code that is derived from the hash of the user's password. For example, in at least one implementation, the PIN-like passcode comprises a sequence of numbers randomly removed from the hash result of the user's or client password. Accordingly, one or more implementations of the present invention provide a system where an authentication server can authenticate both a user/client password and a user/client PIN-like passcode without storing any information relating to the PIN-like passcode itself, and where the stored value of the password hash has been randomly altered by the removed PIN-like passcode, henceforth possessed only by the user or client device, making it more difficult to determine the original password from a brute-force attack.

Accordingly, implementations of the present invention provide for a highly secure authentication system. In particular, the disclosed authentication system may be resistant to quantum computer attacks because of the system's reliance on a randomly selected passcode that is not selected from the password hash each time, but selected once and supplied by the user or client device each time thereafter, to authenticate the password hash. As used herein, a PIN-like passcode comprises a second token used for authentication. The second token may comprise any combination of numbers, letters, symbols, and characters. Additionally, because the authentication system of the present invention does not store the second token, the second token is far less exposed to unintended disclosure. For example, if an authentication system of the present invention were to be breached, an attacker would not have access to either the user's passwords or second tokens.

Figure 1:
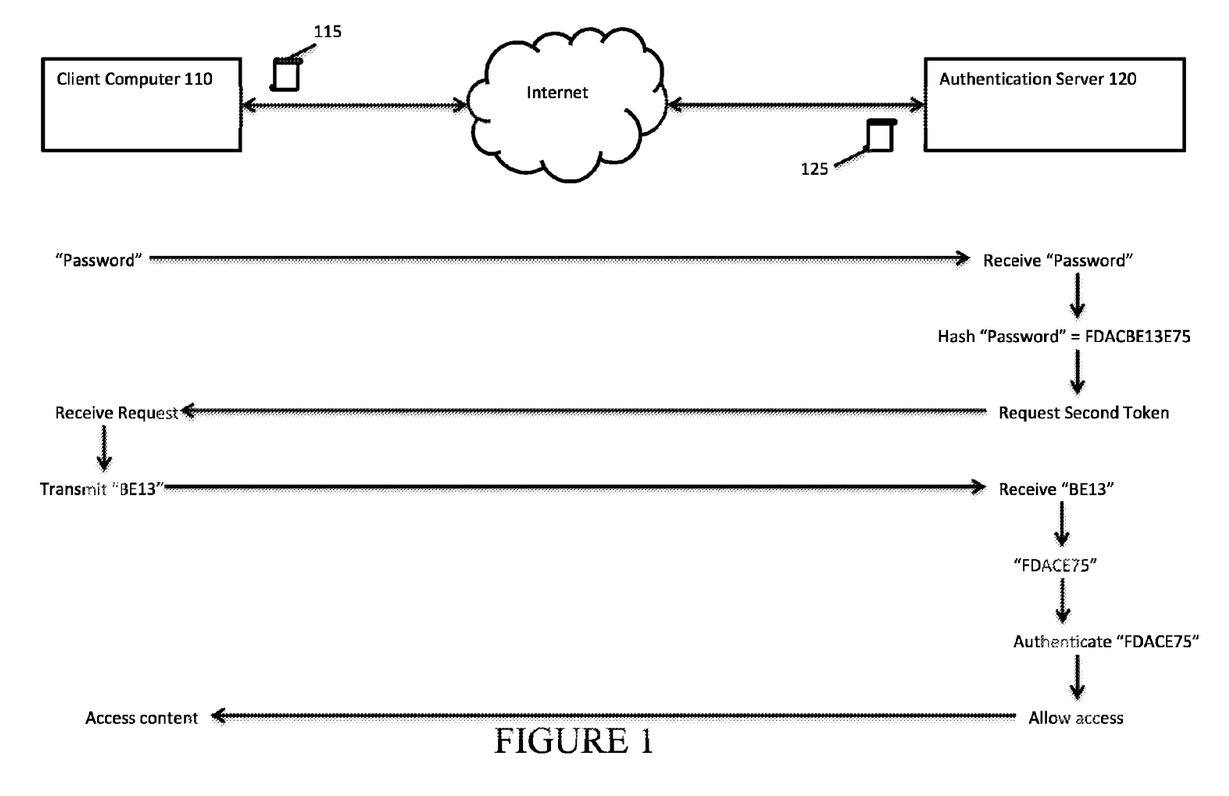
FIG. 1 illustrates the communication sequence between a depicted client computer and a server.

FIG. 1 depicts an authentication system 100 of the present invention. The authentication system 100 comprises a client computer 110 and an authentication server 120 in communication through the Internet. The client computer 110 communicates data packets 115 to the authentication server 120, which in turn, communicates back data packets 125 to the client computer 110.

FIG. 1 also shows a sequence of communications between the client computer 110 and the authentication server 120. In the exemplary communications, the client computer 110 transmits data packets 115 containing various authentication tokens to the authentication server 120. In response to the communications from the client computer 110, the authentication server 120 responds with data packets 125 containing appropriate prompts and, if proper authentication is achieved, access to a syndicated data.

Turning to the depicted example, various steps in an authentication process are depicted. It should be understood, however, that the depicted steps may occur over a previously encrypted connection (e.g., https) such that transmitted passwords are not sent over open lines. In the depicted example, the client computer 110 transmits a password, in this case "Password," to the authentication server 120. The authentication server 120 performs a hash on the received password (i.e., "Password"). For purposes of simplicity and clarity, in this example, the hash of "Password" returns "FDACBE13E75." One will understand, however, that in practice hash functions may return significantly larger numbers.

Either prior to performing the hash or after performing the hash, the authentication server 120 can request a second token from a user. In at least one implementation, the second token can be requested through a delivery vector different than that used to receive the password. For example, if the password was delivered from a computer console, the authentication server can request a second token be delivered through a mobile cellphone that is associated with the user.

The second token can comprise a previously selected portion of the password hash. A computer can randomly select the previously selected portion at the time the user originally creates his or her password. For instance, in this example, when the user originally created a password of "Password" the receiving computer can perform a hash of "Password." As disclosed above, the hash can result in a number "FDACBE13E75." The computer can then randomly select a portion of the hash to be used a second token. For instance, in this case the second token may be "BE13" (FDACBE13E75).

In at least one implementation, additional characters beyond the second token may also be removed. For instance, a system can be configured to remove four characters for a second token, plus an additional ten characters past the token. In this example, a user would only be required to memorize a four character second token, while the resulting modified password hash would actually have a 14 characters missing. In at least one implementation, removing these additional characters creates a modified hash that is harder to crack.

In various implementations, the selection of the second token can be manipulated by specifying a particular required length for the second token or by specifying a particular pattern for the second token. For example, a user may specify that instead of selecting concurrent numbers within the hash, the computer should randomly select a series of three numbers that are at specific intervals apart. For instance, if the user specified a second token that is based upon intervals of two, the computer could return a second token of "AEE" (FDACBE13E75). In contrast, if the set increment was one interval apart, the computer could return of a second token of "CE3" (FDACBE13E75).

Once the computer provides the user with the second token, the computer can erase the second token from its memory and store the modified hash, which comprises the password hash minus the second token characters, and minus other characters that may also be removed. Additionally, the computer can save the specific settings that were used to generate the second token after its random position was selected.

Returning now to the example depicted in FIG. 1, when the authentication server 120 receives the second token, the hashed password can be searched for the second token. In searching for the second token, the authentication server 120 can rely upon the specific settings that were used to generate the second token. Upon identifying the second token within the hashed password, the matching portion of the hashed password can be removed. In the case of a second token "BE13," this would result in an authentication token of "FDACE75."

Once the authentication server 120 has identified the authentication token, the authentication server 120 can authenticate a user by verifying that the resulting authentication token matches the modified hash that was previously stored. In this way, a user or client device is able to provide the authentication server 120 with a password ("Password") and a second token ("BE13"). Advantageously, the authentication server 120 does not store the second token. Additionally, the second token is randomly generated by randomly selecting a portion of a password hash, which password hash comprises a pseudo-random sequence of numbers.

Implementations of the present invention can be used within a variety of different systems. For example, biometric hashes from fingerprints, iris scans, heart rhythms, etc. can also be used to create a second token and authentication scheme as disclosed above. Specifically, the biometric information can be hashed, and a randomly selected second token can be removed from the hash. Similar, implementations can be used in the so-called "internet of things" comprised of sensors, tags, doors, appliances, vehicles, devices, meters, machines, cameras, computers, etc., in order to prevent cloning, spoofing and replay attacks. A refrigerator appliance, for example, may access a supply chain automatically, which then can authenticate the appliance using both a password from a user, and a protected PIN-like passcode. The first token or password may also or instead be a unique identifier from an authentication service using one-time passwords. The second token may be unknown to the user, supplied automatically to the client to authenticate the client to the authentication server on demand, and could possibly be a larger token than the first token. This two-factor approach increases the likelihood that the appliance and user combination are both correct.

Figure 2:
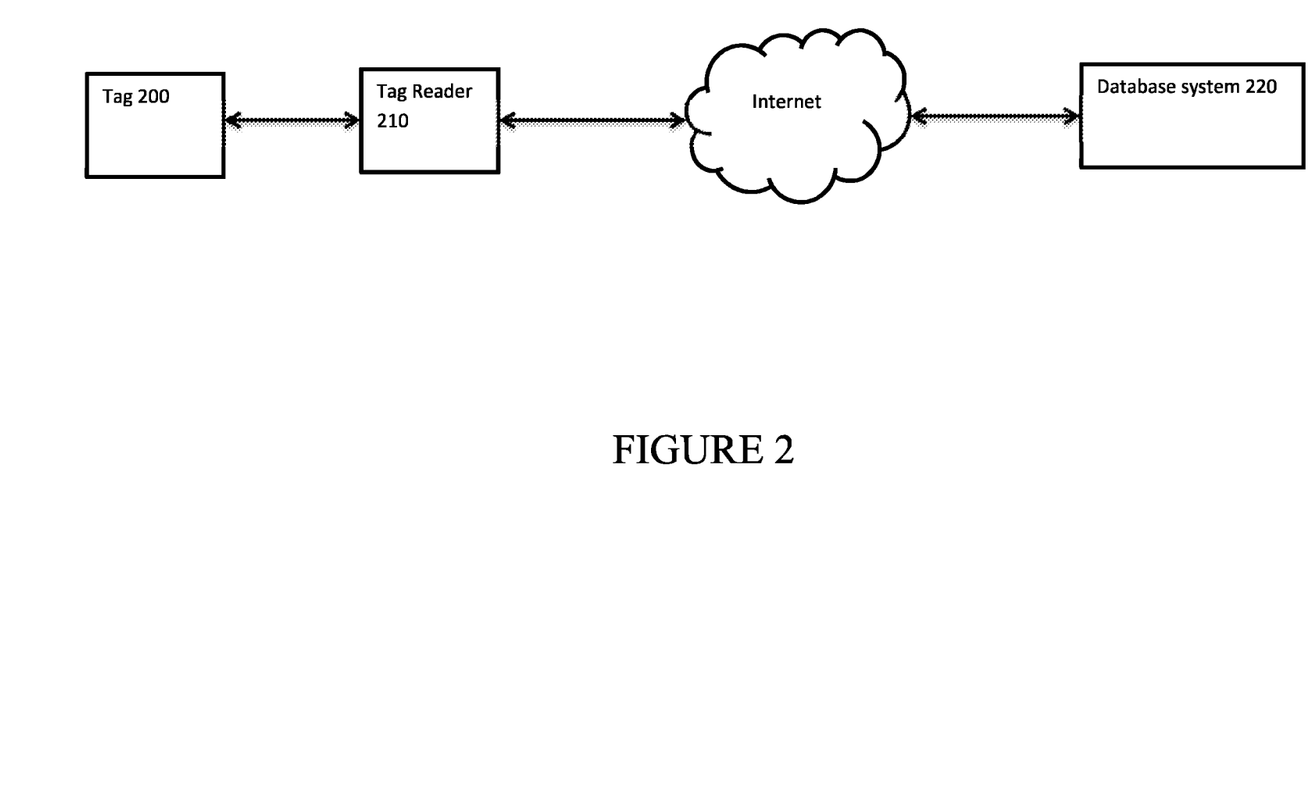
FIG. 2 depicts an embodiment of the present invention associated with an RFID system.

Turning now to FIG. 2, FIG. 2 depicts an RFID system that utilizes an embodiment of an authentication system of the present invention. Specifically, FIG. 2 depicts a tag 200, a tag reader 210, and a database system 220 that is in communication with the tag reader 210. The tag 200 may comprise a public ID and a secret protected key or passcode. The database system 220, on the other hand, may comprise owner or user IDs and various additional information relating to the individual RFID tags 200. For example, the RFID tags 200 may be attached to inventory within a warehouse. The database system 220 may comprise information relating to the owners of the respective inventory, information relating to the inventory itself, and other similar useful information.

In at least one embodiment, implementing an authentication system of the present invention within an RFID system comprises using a tag reader 210 to query a tag 200. Specifically, the tag reader 210 requests the tag's public ID. In response to receiving the request, the tag 200 can transmit to the tag reader 210 the tag's associated public ID. The tag reader 210 can then send the public ID to the database system 220. The database system 220 can query an internal database for the public ID. If the public ID is detected the database can send a random code to the tag reader 210. The tag reader 210 can then forward the random code to the tag 200.

Using the random code, the tag 200 can encrypt its secret key. The tag 200 can then forward the encrypted secret key to the tag reader 210, which can then forward the encrypted secret key to the database system 220. Once the database system 220 has received the encrypted secret key, the database system 220 can decrypt the secret key using the previously generated random code. Alternatively, a tag may be programmed to produce its own internal random keys in sync with the database.

Relying upon methods similar to those described above, the database system 220 can generate a hash of the public ID received from the tag 200. The database system 220 can then identify within the hash a sequence of numbers that matches the decrypted secret key. As disclosed above, the matching sequence of numbers can be removed from the hash to create on authentication token. Alternatively, if the secret key was used to encrypt the random key sent from the authentication server, the entire hash made from the public ID could be tested methodically to see which sequence of characters will produce the correct decryption of the random key, the server knowing the length of the secret key for this test. When this sequence is found, it can then be used to generate the authentication token for a match. Using the public ID hash as an intermediate identifier, and not storing it, resists casual hacking of the database and brute force attacks on the public identifiers of found tags.

In at least one implementation, the authentication token can comprise an ownership ID that is associated with the tag 200. As such, a third-party that had access to the tag 200 would still be unable to determine who owned the item and any other information associated with the tag. In particular, determining the ownership of the item would require access to private information stored within the tag along with the ability to properly process the public ID and the secret key. Alternatively, a simple read only tag, such as a barcode or QR code, can be used as a public ID to display ownership if the user also has the PIN-like passcode or secret key, in order to access information about the product tagged, or complete product registration, or to document anything related to the product. In at least one implementation, resetting the password without altering the tag can change ownership.

While the above-described RFID system is described with a simplified authentication system, one will understand, that various additional security features can be implemented in the system described. For example, the tag 200 may be configured to only provide its public key to tag readers 210 that provide a specific code to the tag 200. Additionally, the tag 200 can be configured to provide its secret key only in response to receiving a particular random number from the database server 220. Further, in order to decrypt the secret key, the database server 220 may need access to both the random code that was transmitted to the tag 200 and to a private key that is only present on authenticated database servers 220.

The above-described implementations have been simplified for the sake of clarity and brevity. In at least one implementation, however, implementations of the present invention can be used in conjunction with other known security measures. For example, in at least one implementation, Challenge-Handshake Authentication Protocol (CHAP), Public key/private key encryption, and other similar known security systems can be implementation with the present invention. In digital money or cryptographic currencies that rely on hashes for securing stored value, a second token protocol would be a hedge against irreversible theft by quantum computing methods that may initially reveal themselves through such mischief.

Figure 3:
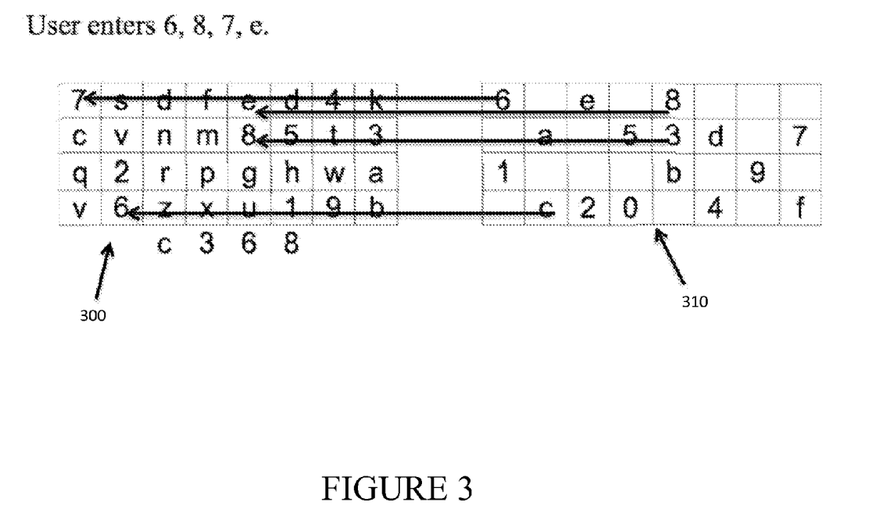
FIG. 3 depicts an embodiment of a random password generator.

Additionally, in at least one implementation, the present invention can use a random password generator as depicted in FIG. 3. Specifically, FIG. 3 depicts a randomly generated digital grid 310. The randomly generated digital grid 310 may be displayed to a user when the user attempts to provide his or her password and/or second token. The randomly generated digital grid 310 may be uniquely generated and randomized each time the user attempts to enter his or her password and/or second token. Additionally, blank spaces may be present on the randomly generated grid to allow false entries in order to confuse long-term key loggers.

FIG. 3 also depicts a second permanent grid 300 that a user may have printed on a paper, stored within a computer file, or otherwise available to the user. The permanent grid 300 may be configured to contain at least each letter within the user's password and/or second token placed within randomly selected squares. The permanent grid 300 may also contain additional characters so as to obfuscate a user's password and/or second token. Additionally, the permanent grid may be used to as a personal identifier in some situations, such as voice communications with the authentication service, etc.

In at least one implementation, when a user attempts to authenticate, the randomly generated digital grid 310 is displayed to a user. A user can then reference the permanent grid 300 and identify his or her password or second token. In the depicted exemplary case, the password comprises "c368." Upon identifying the location of each character of the password within the permanent grid 300, the user can then map the location of each character to locations within the randomly generated digital grid 310, as indicated by the various arrows within FIG. 3. The user can then enter as a password the characters that are within the identified locations within the randomly generated digital grid 310, in this case, "687e."

In this way, each time a user enters a password and/or PIN-like passcode based upon the randomly generated digital grid 310 the user is entering what amounts to a one-time randomly generated password. Because the authentication server has access to both the second permanent grid 300 and the randomly generated digital grid 310, the authentication server can determine the actual password that is associated with the received one-time randomly generated password.

Accordingly, FIGS. 1-3 and the corresponding text illustrate or otherwise describe one or more components, modules, and/or mechanisms for implementing a novel authentication system. One will appreciate that implementations of the present invention can also be described in terms of methods comprising one or more acts for accomplishing a particular result. For example, FIGS. 4 and 5 and the corresponding text illustrate or otherwise describe a sequence of acts in a method for authenticating a user. The acts of FIGS. 4 and 5 are described below with reference to the components and modules illustrated in FIGS. 1-3.

Figure 4:
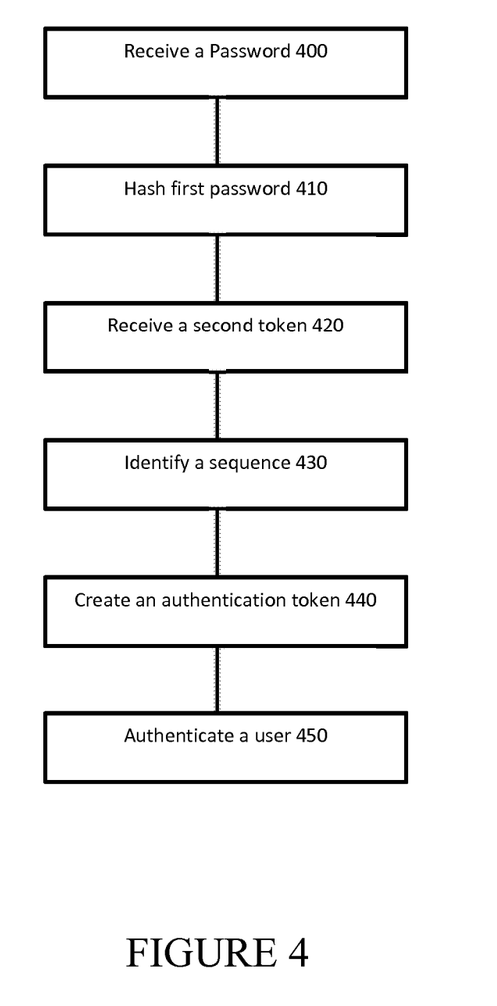
FIG. 4 depicts a flowchart of an implementation of a method for authenticating a user.
Figure 5:
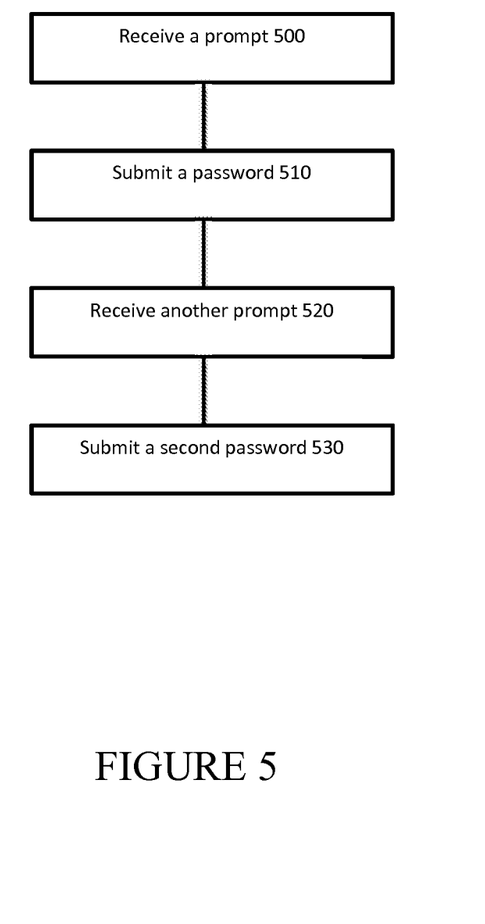
FIG. 5 depicts a flowchart of another implementation of a method for authenticating a user.

For example, FIG. 4 demonstrates that a method for authenticating a user can comprise an act 400 of receiving a password. Act 400 includes receiving from a user a password. For instance, FIG. 1 depicts a client computer 110 sending a data packet 115 to an authentication server 120. The data packet 115 may comprise a user password.

FIG. 4 also shows that the method can comprise an act 410 of hashing a first password. Act 410 includes performing a hash on the password, wherein the hash function generates a password hash. For example, FIG. 1 depicts an authentication server 120 that performs a hash function on "Password," resulting in a password hash of "FDACBE13E75."

Additionally, FIG. 4 shows that the method can comprise an act 420 of receiving a second token. Act 420 can include receiving a second token from the user, wherein the second token is different than the password. For example, FIG. 4 depicts the authentication server 120 receiving a second token, "BE13," from the client computer 110.

FIG. 4 also shows the method can comprise an act 430 of identifying a sequence. Act 430 can include identifying a sequence of characters associated with the second token within the password hash. For example, FIG. 1 and the accompanying description, describe the authentication server 120 identifying characters "BE13" within the password hash.

Further, FIG. 4 depicts that the method can comprise act 440 of creating an authentication token. Act 440 can include creating an authentication token by removing the sequence of characters from the password hash. For example, FIG. 1 depicts the authentication server 120 creating an authentication token, "FDACE75," by removing the sequence of characters, "BE13," from the password hash.

Further still, FIG. 4 depicts the method can comprise act 450 of authenticating a user. Act 450 can include authenticating the user if the authentication token matches a stored value. For example, FIG. 1 depicts the authentication server 120 authenticating a client computer 110 after determining that the authentication password matched a stored modified password hash.

In addition to the foregoing, FIG. 5 depicts that an alternative or additional implementation for authenticating a user can comprise an act 500 of receiving a prompt. Act 500 can include receiving a prompt to submit a password. For example, FIG. 1 depicts a client computer 100 that can receive a data packet 125 from an authentication server 120. The data packet 125 can comprise a password prompt.

Additionally, FIG. 5 depicts that the method can comprise an act 510 of submitting a password. For example, FIG. 1 depicts a client computer 110 submitting a data packet 115. In at least one implementation, the data packet 115 can comprise a password (e.g., "Password").

FIG. 5 also depicts that the method can comprise an act 520 of receiving another prompt. Act 520 can include receiving a prompt to submit a second password. FIG. 1 depicts an authentication server 120 requesting a second token from a client computer 110.

Further, FIG. 5 depicts that the method can comprise an act 530 of submitting a second password. Act 530 can comprise submitting a second password, wherein the second password comprises a previously selected sequence of characters derived from a hash of the user password. For example, FIG. 1 depicts a client computer 110 submitting a second token, "BE13," to an authentication server 120. The submitted second token comprises a sequence of characters derived from the password hash.

Accordingly, implementations of the present invention provide a double authentication system. In at least one implementation, the double authentication system requires both a password and a PIN-like passcode to authenticate a particular user. The authentication system, however, does not need to store the PIN-like passcode in order to properly authenticate a user. As such, a user's PIN-like passcode may remain protected from a data breach, even if the breach exposes authentication sensitive data.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A method for authenticating a user or client device, the method comprising:
   receiving, from a client computer a digital communication transmitted over a network connection, wherein the digital communication comprises a password;
   performing, using a computer processor at an authentication server, a hash function on the password, wherein the hash function generates a password hash;
   storing the password hash within local memory of the authentication server;
   receiving from the client computer another digital communication transmitted over a network connection, wherein the other digital communication comprises a second token that is different than the password;
   searching the password hash, with the computer processor at the authentication server, for a sequence of characters associated with the second token;
   creating an authentication token by removing, with the computer processor at the authentication server, the sequence of characters from the password hash;
   accessing a database stored at the authentication server, wherein the database comprises a list of validated user authentication credentials; and
   authenticating the user if the authentication token matches a validated user authentication credential stored within the database.

2. A method as recited in claim 1, wherein the sequence of characters are associated with the second token through a known mathematical operation.

3. A method as recited in claim 1, further comprising:
   prompting a user for a new password;
   receiving the new password;
   performing a hash function on the new password, wherein the hash function generates a new password hash;
   randomly selecting a sequence of characters from the new password hash, wherein the random selection is performed according to predetermined pattern; and
   providing the user or client device with a second token that is associated with the sequence of characters.

4. A method as recited in claim 1, further comprising:
   initiating a request for the second token through a different communication vector than the client computer; and
   receiving the second token through the different communication vector.

5. A method as recited in claim 4, wherein the different communication vector comprises a communication to a mobile cellphone associated with the user.

6. A method as recited in claim 1, wherein the sequence of characters comprises a set of characters that appear in a pre-defined pattern within the password hash.

7. A method as recited in claim 1, wherein the sequence of characters comprises a set of characters that appear in a pre-defined, non-sequential pattern within the password hash.

8. A method as recited in claim 1, further comprising creating an authentication token by removing, with the computer processor at the authentication server, the sequence of characters from the password hash along with a pre-defined number of additional characters.

9. A method as recited in claim 1, wherein the password comprises information received from a biometric input device and the second token comprises a character string received from the user.

10. A computer system for authenticating a user or client device, comprising:
one or more processor; and
one or more computer-readable media having stored thereon executable instructions that are executable by the one or more processors to configure the computer system to perform at least the following:
receive, from a client computer a digital communication transmitted over a network connection, wherein the digital communication comprises a password;
perform, using a computer processor at an authentication server, a hash function on the password, wherein the hash function generates a password hash;
store the password hash within local memory of the authentication server;
receive from the client computer another digital communication transmitted over a network connection, wherein the other digital communication comprises a second token that is different than the password;
search the password hash, with the computer processor at the authentication server, for a sequence of characters associated with the second token;
create an authentication token by removing, with the computer processor at the authentication server, the sequence of characters from the password hash;
access a database stored at the authentication server, wherein the database comprises a list of validated user authentication credentials; and
authenticate the user if the authentication token matches a validated user authentication credential stored within the database.

11. The computer system of claim 10, wherein the executable instructions include instructions that are executable to configure the computer system to:
initiate a request for the second token through a different communication vector than the client computer; and
receive the second token through the different communication vector.

12. The computer system of claim 10, wherein the sequence of characters comprises a set of characters that appear in a pre-defined pattern within the password hash.

13. The computer system of claim 10, wherein the sequence of characters comprises a set of characters that appear in a pre-defined, non-sequential pattern within the password hash.

14. The computer system of claim 10, wherein the executable instructions include instructions that are executable to configure the computer system to create an authentication token by removing, with the computer processor at the authentication server, the sequence of characters from the password hash along with a pre-defined number of additional characters.

15. The computer system of claim 10, wherein the computer system further comprises:
a biometric input device that:
receives biometric information from the user,
derives the password from the biometric information, and
communicates the password to the authentication server over the network connection.

16. The computer system of claim 15, wherein the second token is received from the user after the user has transmitted the password by interacting with the biometric input device.

17. The computer system of claim 10, wherein the computer system further comprises:
a Radio-Frequency Identification (RFID) tag reader that is in communication with the authentication server, wherein the RFID tag reader is configured to:
query an RFID tag and receive a public identification associated with the RFID tag;
send the public identification to the authentication server for verification;
upon proper authentication, receive from the RFID tag an encrypted secret key; and
send the secret key to the authentication server, wherein, once decrypted the secret key comprises the second token.

18. A computer system for authenticating a user or client device, comprising:
a biometric input device configured to:
receive biometric information from the user,
derive a password from the biometric information, and
communicate the password to the authentication server over the network connection; and
one or more processor; and
one or more computer-readable media having stored thereon executable instructions that are executable by the one or more processors to configure the computer system to perform at least the following:
receive, from the biometric input device a digital communication transmitted over a network connection, wherein the digital communication comprises the password,
perform, using a computer processor at the authentication server, a hash function on the password, wherein the hash function generates a password hash,
store the password hash within local memory of the authentication server,
receive from a client computer another digital communication transmitted over a network connection, wherein the other digital communication comprises a second token that is different than the password,
search the password hash, with the computer processor at the authentication server, for a sequence of characters associated with the second token,
create an authentication token by removing, with the computer processor at the authentication server, the sequence of characters from the password hash,
access a database stored at the authentication server, wherein the database comprises a list of validated user authentication credentials, and
authenticate the user if the authentication token matches a validated user authentication credential stored within the database.

19. The computer system of claim 18, wherein the biometric input device utilizes the one or more processors and communicates to the authentication server through the client computer.

* * * * *